Figure 1:
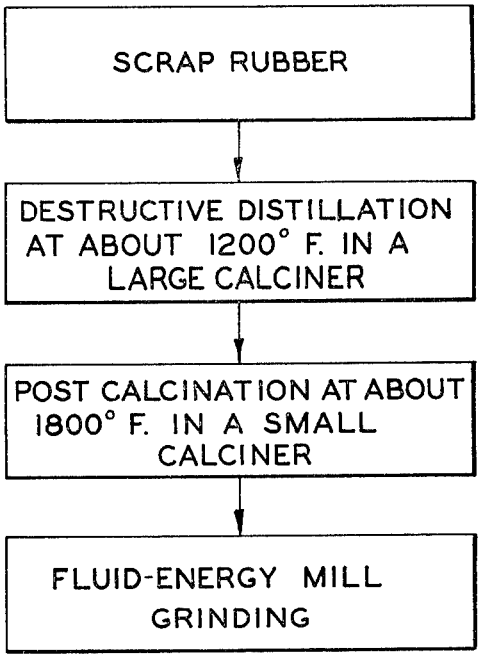
Figure 2:
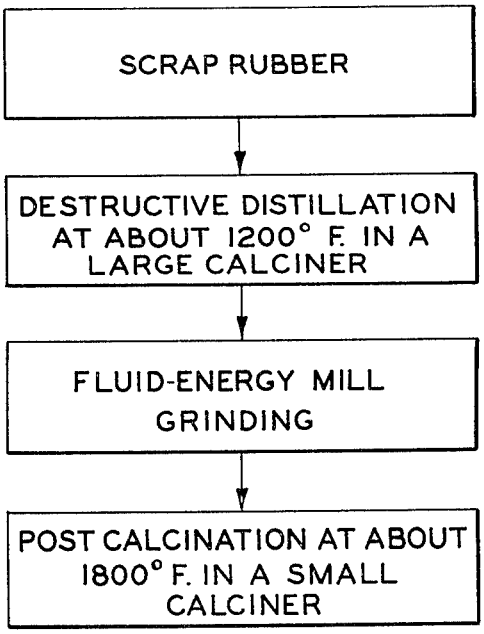
Figure 3:
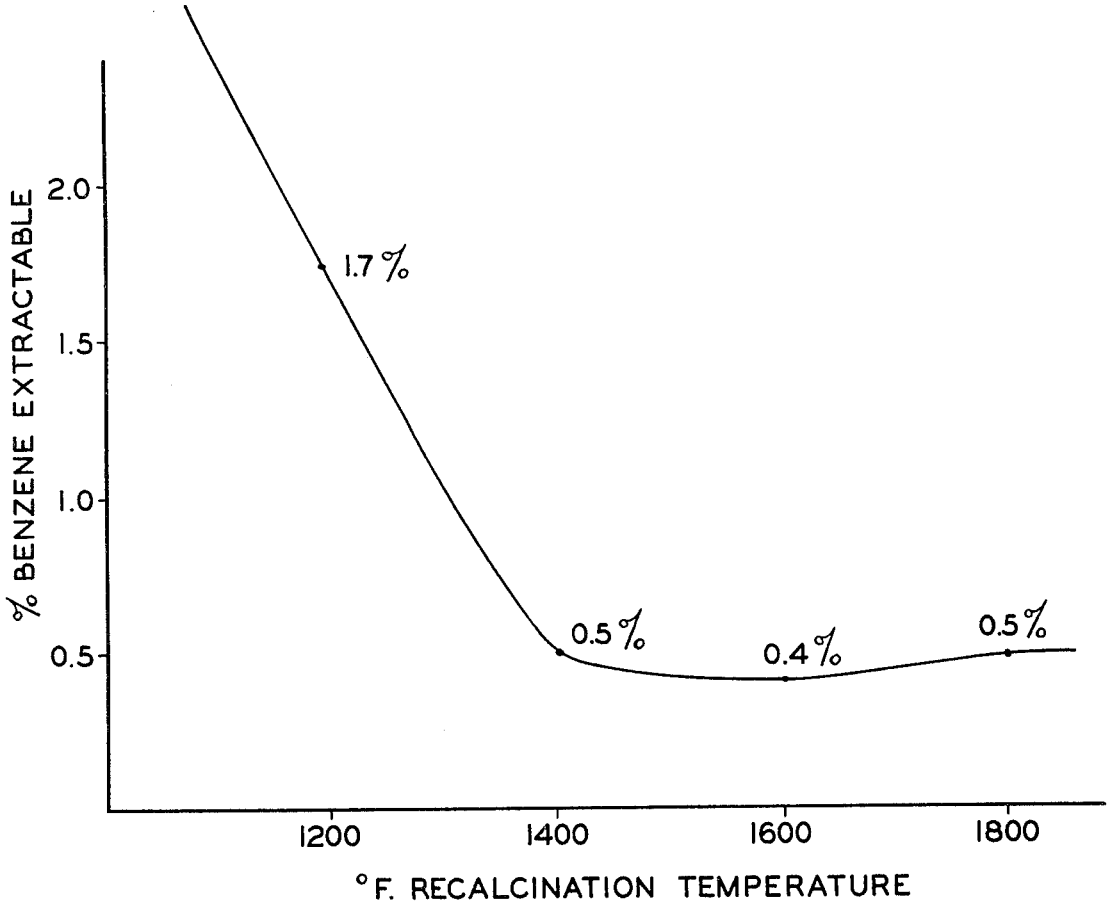

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 7

T940,011

POST-CALCINATION OF VULCANIZED-RUBBER CHAR

Grant Crane, Woodrow A. Wilson, and Edward L. Kay, Akron, Ohio, assignors to The Firestone Tire & Rubber Company, Akron, Ohio

Continuation of application Ser. No. 270,135, July 10, 1972, which is a continuation-in-part of application Ser. No. 235,982, Mar. 20, 1972, now abandoned. This application June 20, 1974, Ser. No. 481,008

**Int. Cl. C09c *1/48***

U.S. Cl. 423—449

2 Sheets Drawing. 11 Pages Specification

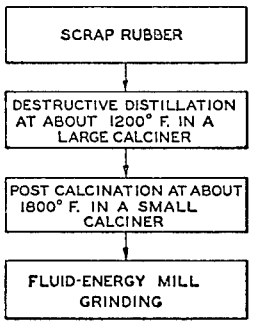

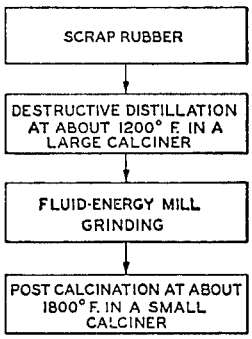

Scrap vulcanized rubber is destructively distilled to produce a char, and this char is post-calcined at 1800° F. or thereabout, usually until the benzene-extractable content is no more than substantially 0.5 percent of the weight of the char. The post calcination preferably is carried out in a smaller vessel than the destructive distillation. The stress-strain properties of vulcanizate reinforced with the post-calcined char and the cure rate of the rubber are increased.